(No Model.)

W. A. THRALL.
RAILROAD TICKET.

No. 455,073.          Patented June 30, 1891.

UNITED STATES PATENT OFFICE.

WILLIAM A. THRALL, OF CHICAGO, ILLINOIS.

RAILROAD-TICKET.

SPECIFICATION forming part of Letters Patent No. 455,073, dated June 30, 1891.

Application filed January 14, 1891. Serial No. 377,735. (No model.)

*To all whom it may concern:*

Be it known that I, WILLIAM A. THRALL, a citizen of the United States, residing at Chicago, Cook county, Illinois, have invented a new and useful Improvement in Railroad-Tickets, of which the following is a specification.

On the majority of railroads the ticket-agents are only supplied with regular local tickets to those stations to which there is sufficient travel to warrant the expense of printing and carrying on hand tickets specially prepared for a particular station, while for stations to which the travel is insufficient to justify this expense and trouble the agents are supplied with a local blank-book of tickets upon which the name of the selling-station is printed, a blank being left for the name of the destination, such blanks on ticket and stub to be filled in by the agent. These latter tickets are defective in several ways. They are apt to be illegible, easy to alter, even, it may be said, inviting alteration, and are exceedingly inconvenient. Moreover, the agent may collude with the passenger and issue the ticket to a station beyond the passenger's actual destination. The ticket is retained by the passenger and returned to the agent, who then fills out the stub by writing in the name of a station nearer the starting-point than is such destination, and to which the fare may be greatly less than that to the destination, destroys the ticket, and retains the difference in fares, defrauding the railroad company. Several instances of this kind have been accidentally discovered, in one of which the amount thus withheld from the company amounted to some sixteen dollars per ticket. Other tickets were so constructed that when separated they were left with projections opposite the names of the stations between which the ticket was given or with projections upon which the name of a station was printed. These tickets, however, were defective, in that if the projection were torn off there was no way of ascertaining to what station the ticket had originally been issued, the name being entirely upon the projection or no part of it being on said projection.

The object of my invention is to provide a ticket in which these defects shall be obviated, all practical possibility of altering the ticket being avoided. To accomplish this, my ticket, when complete, consists of two parts, the line of separation of such parts being irregular, so that while the name of the destination-station remains intact, partly on the body of the ticket and partly on a projection extending out from the profile thereof, the names of all the other stations on the ticket will be destroyed by being cut wholly or in part from such ticket. One part, or the ticket proper, is given to the passenger, and the other or stub retained by the company, affording a perfect check upon the agent.

The manner of preparing and using my improved ticket will be easily comprehended upon reading the following description and by referring to the drawings, in which—

Figure 1 is a plan view of what may be termed the "blank" or "form" from which the ticket is made; and Fig. 2 is a similar view of the completed ticket comprising two parts, the ticket proper and the stub.

The blank A is provided, as shown, with the name of the selling-station, in this case "Chicago," and with one or more lists of stations arranged in a column, as shown. There may be but one column, or, if preferred, the stub portion may have a duplicate column not intended to be canceled, as hereinafter described. This blank is of course wholly useless as a ticket to any place. If now it be desired to make from it a ticket to any of the stations enumerated thereon—as, for instance, to "Lake Geneva"—the blank is separated by means of a punch or cutter or by tearing it by means of a properly-shaped ruler upon an irregular line $a\ b$, this line of separation being such that the name of the destination-station remains intact partly upon a projecting point $c$ upon the ticket proper B and partly upon the body of the ticket, as shown, while the names of the remaining stations are divided in two and canceled. At the same time a notch is formed in the stub which cannot be filled up, so that any alteration of the stub is prevented. In this way a two-part ticket is formed, one part, the passenger-ticket, having a sloping profile, as shown, part of the name of the destination-station extending out upon the projection $c$ and the other names canceled and utterly destroyed. The advantage obtained by using the sloping line is that if the projection be torn off, either by accident or design, the name of the station to which the ticket was originally issued can be found by continuing the sloping lines on either side of the projection, since it is obvious that their point of intersection would come opposite such name. The portion having the projection is given to the passenger for his ticket, and the other portion or stub is retained by the agent. Neither portion is alterable, and the peculiar form given the two parts serves as a practically perfect check upon the agent, who must deliver to the company a stub for every ticket sold. It will thus be seen that the novelty of my improved ticket resides in the fact that it is made in two parts formed by dividing a blank or form upon an irregular line, and that its essential characteristics, which also distinguish it from all prior tickets, are that when so divided a ticket is formed good only to the selected destination, the name of such destination alone remaining intact upon a projection partly upon the edge or profile of the ticket and partly upon the body of such ticket, that all the other names are canceled and destroyed, that the stub portion presents a profile which is the exact counterpart of the ticket, and that the profile of the ticket is formed by lines sloping away from the base of the projection, so that if such projection be torn off the name of the destination can be determined by prolonging the lines of the profile until they intersect.

This ticket, moreover, is perfectly simple and legible, thereby avoiding any confusion or mistake as to the station to which it is to be issued, and takes far less time to make than is required to fill in a blank ticket by hand.

My ticket is intended to supersede the ordinary blank-book ticket, can be used either for a one-way excursion or coupon-ticket, and to a great extent will take the place of the regular card-ticket reading to any given station, since it will obviously be simpler to carry one form capable of being made into a ticket for any one of a list of stations printed on such form than to carry separate tickets for all such stations.

I claim—

1. A railroad-ticket formed by dividing a blank into two parts, the name of the destination-station alone remaining intact on the ticket, partly on a projection thereon and partly on the body thereof, the remaining names being removed in whole or in part from such ticket, substantially as described.

2. A passenger's ticket having the name of one of a series of stations partly on a projection on the profile of such ticket and partly on the body thereof, such profile being formed by lines sloping away from the base of the projection, whereby if the projection be removed from the ticket the name of the station may be ascertained by prolonging such lines until they intersect, such point of intersection coming opposite the point on the ticket where such name was originally located, substantially as described.

3. A railroad-ticket formed by dividing a blank into two parts, one part forming the passenger's ticket and being provided with the name of the destination-station intact partly upon a projection upon the profile thereof and partly on the body of the ticket, all the remaining names thereon being cut in two or obliterated and the other part forming the stub and having an exact counterpart of the profile of the first part, including an indentation exactly opposite the projection on such first part, which indentation and counterpart profile on the stub unalterably indicate the destination to which the ticket was issued, substantially as described.

WILLIAM A. THRALL.

Witnesses:
 JOHN S. BARROW,
 JUDSON LA BARRE.